United States Patent
Brandt et al.

(10) Patent No.: US 11,695,145 B2
(45) Date of Patent: Jul. 4, 2023

(54) METHOD FOR TREATING HYDROGEN-CONTAINING AND OXYGEN-CONTAINING RESIDUAL GASES OF FUEL CELLS, AND RESIDUAL GAS TREATMENT SYSTEM

(71) Applicant: Siemens Energy Global GmbH & Co. KG, Bayern (DE)

(72) Inventors: Torsten Brandt, Forchheim (DE); Markus Hertweck, Baiersdorf (DE); Günter Putschky, Erlangen (DE); Daniel Christian Sander, Fürth (DE); Stefan Siedler, Adelsdorf (DE); Fabian Straub, Heßdorf (DE)

(73) Assignee: Siemens Energy Global GmbH & Co. KG, Bayern (DE)

( * ) Notice: Subject to any disclaimer, the term of this patent is extended or adjusted under 35 U.S.C. 154(b) by 144 days.

(21) Appl. No.: 17/268,456

(22) PCT Filed: Aug. 20, 2019

(86) PCT No.: PCT/EP2019/072196
§ 371 (c)(1),
(2) Date: Feb. 13, 2021

(87) PCT Pub. No.: WO2020/038907
PCT Pub. Date: Feb. 27, 2020

(65) Prior Publication Data
US 2021/0175530 A1 Jun. 10, 2021

(30) Foreign Application Priority Data
Aug. 20, 2018 (EP) .................................... 18189718

(51) Int. Cl.
*H01M 8/0662* (2016.01)
*H01M 8/04089* (2016.01)
(Continued)

(52) U.S. Cl.
CPC ..... *H01M 8/0662* (2013.01); *H01M 8/04089* (2013.01); *H01M 8/04365* (2013.01);
(Continued)

(58) Field of Classification Search
CPC ........... H01M 8/0662; H01M 8/04089; H01M 8/04365; H01M 8/04402; H01M 8/0441;
(Continued)

(56) References Cited

U.S. PATENT DOCUMENTS 3,664,873 A 5/1972 Buswell
2003/0129462 A1 7/2003 Yang
(Continued)

FOREIGN PATENT DOCUMENTS

DE 10203028 A1 7/2003
DE 10297626 T5 2/2005
(Continued)

OTHER PUBLICATIONS

PCT International Search Report and Written Opinion of International Searching Authority dated Oct. 21, 2019 corresponding to PCT International Application No. PCT/EP2019/072196 filed Aug. 20, 2018.

*Primary Examiner* — Matthew W Van Oudenaren
(74) *Attorney, Agent, or Firm* — Wolter Van Dyke Davis, PLLC

(57) ABSTRACT

A method for treating hydrogen-containing and oxygen-containing residual gases of fuel cells, wherein the residual gases are fed to a gas circuit, and a residual gas mixture resulting therefrom is circulated in the gas circuit by a device for converting hydrogen and oxygen to water. In order to reduce the amount of hydrogen and oxygen in the residual gas mixture, at least part of the residual gas mixture is discharged from the gas circuit.

14 Claims, 2 Drawing Sheets

(51) Int. Cl.
*H01M 8/0432* (2016.01)
*H01M 8/0444* (2016.01)
*H01M 8/04119* (2016.01)
*H01M 8/04746* (2016.01)
*H01M 8/04828* (2016.01)
*H01M 8/0438* (2016.01)

(52) U.S. Cl.
CPC ........ *H01M 8/0441* (2013.01); *H01M 8/0447* (2013.01); *H01M 8/04164* (2013.01); *H01M 8/04402* (2013.01); *H01M 8/04462* (2013.01); *H01M 8/04753* (2013.01); *H01M 8/04761* (2013.01); *H01M 8/04843* (2013.01)

(58) Field of Classification Search
CPC ........... H01M 8/04462; H01M 8/0447; H01M 8/04753; H01M 8/04164; H01M 8/04097; H01M 8/04291; H01M 8/04343; H01M 8/0435; H01M 8/04373; H01M 8/04425; H01M 8/04514; H01M 8/04522; H01M 8/04761; H01M 8/04738; H01M 8/04805; H01M 8/04843; H01M 8/06; H01M 8/04156

See application file for complete search history.

(56) References Cited

U.S. PATENT DOCUMENTS

| | | | |
|---|---|---|---|
| 2008/0187788 A1* | 8/2008 | Fellows | H01M 8/04231 429/444 |
| 2015/0194687 A1 | 7/2015 | Yang | |

FOREIGN PATENT DOCUMENTS

| | | |
|---|---|---|
| DE | 102006026539 A1 | 12/2007 |
| DE | 102005035743 B4 | 9/2014 |
| EP | 1323203 A2 | 7/2003 |
| FR | 2870390 * | 11/2005 |
| JP | 2008251312 A | 10/2008 |
| KR | 20130136099 A | 12/2013 |

* cited by examiner

METHOD FOR TREATING HYDROGEN-CONTAINING AND OXYGEN-CONTAINING RESIDUAL GASES OF FUEL CELLS, AND RESIDUAL GAS TREATMENT SYSTEM

CROSS REFERENCE TO RELATED APPLICATIONS

This application is the US National Stage of International Application No. PCT/EP2019/072196 filed 20 Aug. 2019, and claims the benefit thereof. The International Application claims the benefit of European Application No. EP18189718 filed 20 Aug. 2018. All of the applications are incorporated by reference herein in their entirety.

FIELD OF INVENTION

The invention relates to a process for treating hydrogen-containing and oxygen-containing residual gases from fuel cells, and also to a residual gas treatment system.

BACKGROUND OF INVENTION

Such a process and such a system are known, for example, from U.S. Pat. No. 3,664,873 A.

In a fuel cell, energy and heat are produced typically through the combination of hydrogen and oxygen in an electrochemical reaction to produce water as the sole byproduct. For this purpose, the hydrogen is led into an anode gas space and the oxygen is led into a cathode gas space of the fuel cell. The hydrogen can be fed to the anode gas space either as pure hydrogen or as a hydrogen-containing fuel gas. The oxygen can be fed to the cathode gas space as pure oxygen or else for example in the form of air.

A single fuel cell alone delivers an operating voltage of less than one volt. Accordingly, it is customary to stack a multiplicity of fuel cells on top of one another and to combine them into a fuel cell block. Such a block is also referred to as a stack in the specialist literature. By connecting the fuel cells in the fuel cell block in series, the operating voltage of a fuel cell system can be a few hundreds of volts.

However, even hydrogen and oxygen of technical grade purity still contain constituents (e.g. contents of inert gas) which do not participate in the reaction. These constituents have to be discharged from the fuel cell as residual gases. However, the residual gases can also still contain fractions of the respective reaction gas. While an oxygen content can generally be mixed with the ambient air without problems, a hydrogen content involves an inherent risk of fire.

Accordingly, in known fuel cell systems the hydrogen-containing residual gas is conveyed via a pipeline to a safe area and released to the ambient air there. If the fuel cell system is installed in an installation space, the safe area is for example an area above the head height of operating personnel of the fuel cell system. However, there is always a combustible gas mixture present in the vicinity of the residual gas outlet, from which ignition sources must be kept safely away.

It is known from DE 10 2006 026 539 A1 to mix the hydrogen-containing residual gas with an oxygen-containing residual gas in a mixing device in the form of a sintered body and to introduce the resulting gas mixture into the ambient air of the fuel cell system.

DE 10 2005 035 743 B4 discloses feeding the residual gases to a catalytic reactor and converting them there to water. This can avoid the amount of hydrogen-containing and oxygen-containing residual gas.

DE 102 03 028 A1 discloses a process for operating a fuel cell system in which the exhaust gases coming from an anode space and a cathode space of a fuel cell are sent to a catalytic combustion, in which the temperature at which the hot exhaust gases of the catalytic combustion heat a heat sink can be controlled or regulated rapidly, reliably and with simple means without in the process impairing the stable operation of the fuel cell system.

The discharging of residual gases proves to be more problematic in fuel cell systems situated in an installation space which is closed off from outside air.

U.S. Pat. No. 3,664,873 A has already disclosed a fuel cell system having a fuel cell module arranged in a housing and in which oxygen-containing and hydrogen-containing residual gas of the fuel cell module is released into the atmosphere of the space between the housing and the fuel cell module. To avoid ignitable mixtures in the atmosphere, the atmosphere is circulated by a fan through a catalytic reactor in which the hydrogen is reacted with the oxygen to give water or water vapor, with the evolution of heat. However, complex measures are required for the conveyance of the gas stream during the circulation through the housing interior to the reactor. For instance, in the known case, the interior is specially designed for such a circulation. In addition, the operation of such a system is possible only until all oxygen in the atmosphere has been consumed and the original oxygen volume has been replaced by product water. The operating time of the fuel cell system is therefore limited, which usually makes the use of such a system impossible in practice.

SUMMARY OF INVENTION

Taking this as a basis, it is an object of the present invention to specify a process for treating hydrogen-containing and oxygen-containing residual gases from fuel cells and also a residual gas treatment system, the use of these making it possible to prolong the operating time of a fuel cell system.

This object is achieved by a process and a residual gas treatment system according to the independent patent claims. Advantageous configurations are each a subject of the dependent claims.

In the process according to the invention for treating hydrogen-containing and oxygen-containing residual gases from fuel cells, the residual gases are fed to a gas circuit and the resulting residual gas mixture is circulated in the gas circuit through a device for converting hydrogen and oxygen into water in order to reduce the amount of hydrogen and oxygen in the residual gas mixture. According to the invention here, a portion of the residual gas mixture is discharged from the gas circuit.

The invention is based on the consideration that, as a result of the circulation of the residual gas mixture through the device for converting hydrogen and oxygen into water, the hydrogen content and the oxygen content and hence the amount of residual gas mixture can be reduced to the extent that the risk of an ignition can be avoided and at least a portion of the residual gas mixture can be safely discharged from the gas circuit.

The gas circuit is then ready again to receive "fresh" residual gas from the fuel cells. Overall, as a result of these measures, the capacity to receive and to treat residual gases from the fuel cells and hence the operating time of the fuel cells can be increased.

According to the invention, the portion of the residual gas mixture is discharged from the gas circuit when a predefined or predefinable pressure of the residual gas mixture in the gas circuit is exceeded, advantageously in addition when there is also no longer any conversion of oxygen and hydrogen taking place. The content of hydrogen and/or oxygen has then reached a minimum, or has fully reacted.

In the case of fuel cells which are situated in an installation space which is closed off from outside air, the discharged portion of the residual gas mixture is advantageously fed to a gas reservoir. In the case of fuel cells which are situated in an installation space with ambient air, the discharged portion of the residual gas mixture is advantageously introduced into the ambient air.

The device for converting hydrogen and oxygen into water is advantageously a catalytic recombiner (e.g. a platinum-aluminum oxide recombiner). However, a catalytic reactor can also be used.

In the case of a feed of the residual gas mixture to a gas reservoir, according to a further advantageous configuration the discharged portion of the residual gas mixture is selectively fed to one of at least two gas reservoirs. For safety reasons, a slightly oxygen-enriched residual gas mixture is aimed for in principle. However, if, for example, there is also the possibility of a slightly hydrogen-enriched residual gas mixture, these two different residual gas mixtures are advantageously each fed to different gas reservoirs and stored therein in order to further increase safety.

Advantageously in this case a discharged residual gas mixture with an excess of oxygen is fed to a first gas reservoir and a discharged residual gas mixture with an excess of hydrogen is fed to a separate second gas reservoir. Depending on the degree of enrichment of the residual gas mixture in oxygen and/or hydrogen, it is also possible for more than two separate gas reservoirs to be used.

The portion of the residual gas mixture can also be discharged from the gas circuit depending on a predefined or predefinable gas composition. For example, this can be done in a controlled manner such that the discharged residual gas mixture has a gas composition like air. This air can then be utilized further (e.g. as breathable air), in particular in outside-air-independent applications.

According to a further advantageous configuration, alternatively or in addition, the oxygen content and/or the hydrogen content in the residual gas mixture in the gas circuit is detected and the feeding of residual gases into the gas circuit and/or the discharging of residual gas mixture from the gas circuit is/are effected depending on the detected oxygen content and/or hydrogen content.

For reasons of safety, the residual gas mixture is advantageously discharged when there is an excess of oxygen in the residual gas mixture.

The oxygen content and/or hydrogen content or the evolution over time thereof can for example provide information on whether a conversion of oxygen and hydrogen to water is still taking place or whether this process has already ended. Thus, for example, residual gas mixture can be discharged from the gas circuit in a controlled manner when the oxygen content assumes a constant value, because a reaction with hydrogen to give water is no longer taking place.

Alternatively or in addition, a temperature of the device for converting hydrogen and oxygen into water can be detected and the feeding of residual gases into the gas circuit and/or the discharging of residual gas mixture from the gas circuit can be effected depending on the detected temperature. The temperature and/or the evolution over time thereof can also provide information on whether a conversion of oxygen and hydrogen to water is still taking place or whether this process has already ended. Thus, for example, residual gas mixture can here also be discharged from the gas circuit in a controlled manner when the temperature, starting from a normal value in the case of which hydrogen and oxygen are being converted into water, has fallen to a lower value because hydrogen and oxygen are no longer being converted into water.

The residual gases here comprise at least the reaction gases of the fuel cells, and advantageously also comprise purge gases of the fuel cells and/or start-up and shutdown gases of the fuel cells and/or blow-up gases or boil-off gases from liquefied gas reservoirs, in particular all of the gases used for the operation of the fuel cells. Further additional gas disposal or gas treatment systems are therefore no longer necessary.

According to a further advantageous configuration, the operation of the fuel cells and the treatment of the residual gases are controlled and/or regulated in a manner adapted to one another such that the residual gas mixture discharged from the gas circuit has a predefined or predefinable gas composition, in particular has the gas composition of air.

A residual gas treatment system according to the invention for hydrogen-containing and oxygen-containing residual gases from fuel cells comprises—a gas circuit for a circulation mode of a mixture of the two residual gases, and—a device for converting hydrogen and oxygen into water, the device being arranged in the gas circuit in order to reduce the amount of hydrogen and oxygen in the residual gas mixture, wherein at least a portion of the residual gas mixture is dischargeable from the gas circuit.

According to the invention, the system advantageously comprises a pressure sensor which is arranged in the gas circuit and detects a pressure of the residual gas mixture in the gas circuit, and a control device which is configured so that it controls the discharging of the portion of the residual gas mixture from the gas circuit depending on the detected pressure of the residual gas mixture in the gas circuit, advantageously discharges the portion of the residual gas mixture from the gas circuit when a predefined or predefinable pressure of the residual gas mixture in the gas circuit is exceeded.

According to an advantageous configuration, the discharged portion of the residual gas mixture can be fed to a gas reservoir or can be introduced into ambient air.

The system advantageously for this purpose includes a branch arranged in the gas circuit and a valve for controlling a discharging of residual gas mixture from the gas circuit via the branch.

According to a further advantageous configuration, the system comprises at least two gas reservoirs, wherein the residual gas mixture can be selectively fed to one of the gas reservoirs, advantageously a first of the gas reservoirs being a gas reservoir for a residual gas mixture with an excess of oxygen and a second of the gas reservoirs being a gas reservoir for a residual gas mixture with an excess of hydrogen.

The system can further comprise:—a device for detecting the gas composition of the residual gas mixture in the gas circuit, and—a control device which is configured to control the discharging of the residual gas mixture from the gas circuit depending on a predefined or predefinable gas composition.

Alternatively or in addition, the system can also comprise:—a device for detecting the oxygen content and/or the hydrogen content of the residual gas mixture in the gas circuit, and—a control device which is configured to control the feeding of residual gases into the gas circuit and/or the discharging of residual gas mixture from the gas circuit depending on the detected oxygen content and/or hydrogen content.

The system can furthermore comprise:—a device for detecting a temperature of the device for converting hydrogen and oxygen into water and—a control device which is configured to control the feeding of residual gases into the gas circuit and/or the discharging of residual gas mixture from the gas circuit depending on the detected temperature.

The residual gases here comprise at least the reaction gases of the fuel cells, and advantageously also comprise purge gases of the fuel cells and/or start-up and shutdown gases of the fuel cells and/or blow-up gases or boil-off gases from liquefied gas reservoirs, in particular all of the gases used for the operation of the fuel cells. Further additional gas disposal or gas treatment systems are therefore no longer necessary.

The system can additionally include a control device which is configured to control and/or regulate the operation of the fuel cells and the treatment of the residual gases in a manner adapted to one another such that the portion of residual gas mixture discharged from the gas circuit has a predefined or predefinable gas composition, in particular has the gas composition of air.

The aforementioned control devices can also be combined in a single control apparatus.

The advantages stated for the process according to the invention and its advantageous configurations apply correspondingly to the system according to the invention and its advantageous configurations.

BRIEF DESCRIPTION OF THE DRAWINGS

The invention and further advantageous configurations of the invention according to features of the subclaims are elucidated in more detail hereinbelow with reference to exemplary embodiments in the figures. In the figures:

DETAILED DESCRIPTION OF INVENTION

Figure 1:
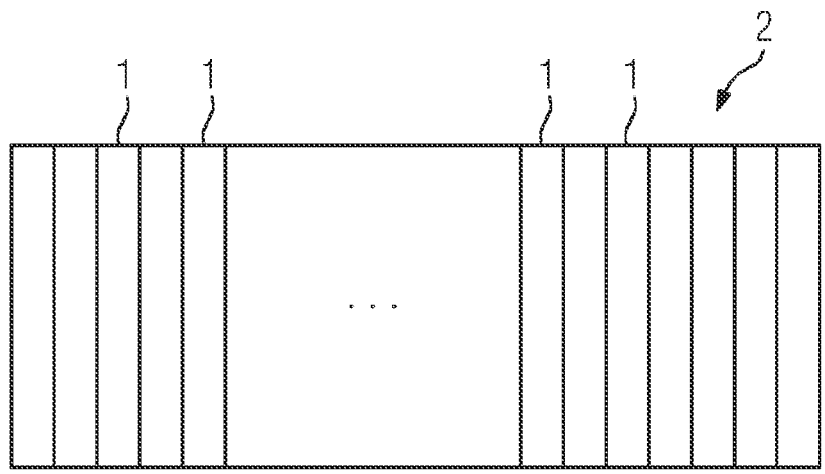
FIG. 1 shows a fuel cell stack with fuel cells.

A single fuel cell alone delivers an operating voltage of less than one volt. Accordingly, as is shown in FIG. 1, it is customary to stack a multiplicity of fuel cells 1 on top of one another and to combine them into a fuel cell block 2. Such a block 2 is also referred to as a stack in the specialist literature. By connecting the fuel cells 1 in the fuel cell block 2 in series, the operating voltage of a fuel cell system can be a few hundreds of volts.

Figure 2:
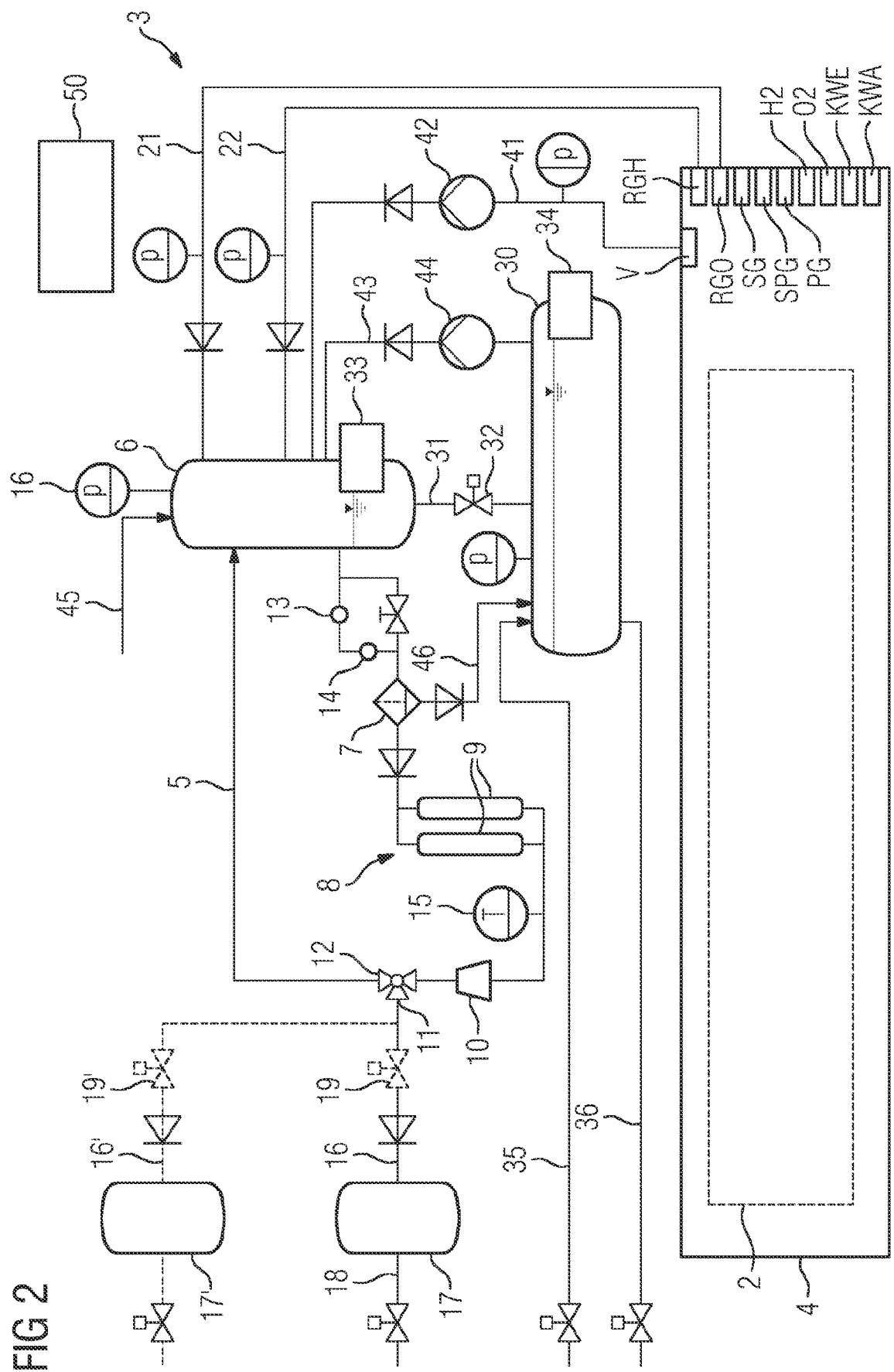
FIG. 2 shows an exemplary embodiment of a residual gas treatment system according to the invention.

FIG. 2 shows a residual gas treatment system 3 according to the invention for treating residual gases from fuel cells. 4 here denotes a fuel cell module which, in addition to a fuel cell block as shown in FIG. 1, also comprises further devices (not shown in more detail) such as valves, sensors, water separators and distributor structures for the supply and removal of operating media to/from the fuel cell block. The fuel cell module 4 has a connection H2 for feeding hydrogen, a connection O2 for feeding oxygen, a connection KWE for feeding cooling water, a connection KWA for discharging cooling water, a connection RGH for discharging hydrogen-containing residual gas, a connection RGO for discharging oxygen-containing residual gas, a connection SG for feeding protective gas, a connection SPG for feeding purge gas, and a connection PG for feeding compressed gas.

The purge gas is required for purging the gas spaces of the fuel cells 1. The compressed gas is required for pressurization using what is known as pressure pads in the fuel cell block 2.

The residual gas treatment system 3 comprises a gas circuit 5 in which, in the direction of flow of a circulating gas, a collecting vessel in the form of a vacuum tank 6, a water separator 7, a device 8 for converting hydrogen and oxygen into water (here in the form of two parallel-connected recombiners 9, e.g. platinum-aluminum oxide recombiners), a compressor 10 and a branch 11 having a 3/2-way valve 12 are connected/arranged one behind the other.

A line 21 runs from the connection RGO of the fuel cell module 4 to the vacuum tank 6 and serves for feeding oxygen-containing residual gas from the fuel cell module 4 to the vacuum tank 6.

A line 22 runs from the connection RGH of the fuel cell module 4 to the vacuum tank 6 and serves for feeding hydrogen-containing residual gas from the fuel cell module 4 to the vacuum tank 6.

An oxygen sensor 13 and a hydrogen sensor 14 are arranged in the gas circuit 5 between the vacuum tank 6 and the water separator 7. In addition, a temperature sensor 15 is arranged in the gas circuit 5 between the device 8 and the compressor 10.

A pressure sensor 16 connected to the vacuum tank 6 serves to detect or to measure the pressure in the vacuum tank 6 and hence in the gas circuit 5.

The residual gas treatment system 3 furthermore comprises a product water tank 30 which is connectible via a line 31 and a valve 32 arranged therein to the bottom of the vacuum tank 6 for discharging product water from the vacuum tank 6 into the product water tank 30.

A sensor 33 for detecting the height of the liquid level in the vacuum tank 6 is situated in the vacuum tank 6.

A sensor 34 for detecting the height of the liquid level in the vacuum tank 6 is also situated in the product water tank 30.

When the gas spaces of the fuel cells are evacuated during the start-up or shutdown of the fuel cell module 4, residual gases have to be discharged from the fuel cells. For this purpose, there is a line 41 between a connection V of the fuel cell module and the vacuum tank 6. A vacuum pump 42, via which these residual gases can be discharged from the fuel cell module 4 into the vacuum tank 6, is connected into the line 41.

The product water tank 30 is additionally connected to the vacuum tank 6 via a line 43 with a vacuum pump 44 arranged therein. The vacuum pump 44 ensures that the pressure in the product water tank 30 is lower than the pressure in the vacuum tank 6. A line 35 and a line 36 are in addition connected to the product water tank 30. The line 35 serves for feeding nitrogen into the product water tank 30 for discharging product water. The product water can then be discharged from the product water tank 30 via the line 36.

The water separator 7 serves to remove entrained water from the residual gas mixture so that is does not pass into the recombiners 9.

The water separator 7 is also connected via a line 46 to the product water tank 30 for feeding separated water.

The branch 11 is connected to a pressure tank 17 via a line 16. A line 18 for emptying the pressure tank 17 is in turn connected to said pressure tank 17.

Optionally, a second pressure tank 17' can be connected to the branch 11, it then being possible via valves 19, 19' to control which of the pressure tanks 17, 17' is connected to the branch 11.

Optionally, a line 45 can also be connected to the vacuum tank 6 for feeding boil-off gas or blow-up gas from liquid reservoirs of the operating gases (not illustrated in more detail).

A control device 50 is connected in wired fashion or wirelessly to the sensors (e.g. temperature sensor 8, pressure sensor 16, oxygen sensor 13, hydrogen sensor 14) and actuators of the fuel cell module and of the residual gas treatment system (e.g. controllable valves such as for example the 3/2-way valve 12, compressor 10, vacuum pumps 42, 44) and detects signals or measured values from these and/or controls the operating state thereof.

During operation of the residual gas treatment system, the vacuum tank 6 is fed with an oxygen-containing residual gas of the fuel cell module 4 via the line 21 and with a hydrogen-containing residual gas of the fuel cell module via the line 22, and these residual gases are mixed in the vacuum tank 6. In the event of a purge of the gas spaces of the fuel cells 1, the purge gases are also fed via these lines 21, 22. In addition, the vacuum tank 6 is fed with start-up and shut-down gases of the fuel cell module 4 via the line 41 and optionally with the boil-off gas or blow-up gas via the line 45. Advantageously, all residual gases arising for the operation of the fuel cells are introduced into the vacuum tank 6.

The residual gas mixture arising in the vacuum tank 6 as a result is circulated/recirculated through the gas circuit 5 and hence also through the device 8 by means of the compressor 10. Hydrogen present in the residual gas mixture is reacted in the device 8 with oxygen present in the residual gas mixture to form water which settles in the vacuum tank 6.

In this way, the hydrogen content and the oxygen content and hence the amount of residual gas mixture can be reduced to the extent that the risk of ignition is avoided and at least a portion of the residual gas mixture can be safely discharged from the gas circuit 5.

The gas circuit 5 is then ready again to receive "fresh" residual gas from the fuel cells. Overall, as a result of these measures, the capacity to receive and to treat residual gases from the fuel cells 1 and hence the operating time of the fuel cells 1 can be increased.

The control device 50 detects the liquid level in the vacuum tank 6 via the sensor 33 and when a predefined liquid height in the vacuum tank 6 has been exceeded opens the valve 32, causing product water to be discharged into the product water tank 30 via the line 31.

In a corresponding manner, the control device 50 detects the liquid level in the product water tank 30 via the sensor 34 and when a predefined liquid height has been exceeded initiates feeding of nitrogen via the line 35, causing product water to be discharged from the product water tank 30 via the line 36.

When the pressure in the gas circuit 5 detected by the control device 50 via the sensor 16 exceeds a predefined value, the control device opens the valve 12 to the branch 11, causing at least a portion of the residual gas mixture to be discharged from the gas circuit 5 into the pressure tank 17. If the installation circumstances permit, the residual gas mixture may alternatively also be introduced into the ambient air.

If two pressure tanks 17, 17' are present, the control device 50 evaluates the oxygen and hydrogen contents detected via the sensors 13, 14 and by controlling the valves 19, 19' feeds a residual gas mixture with an excess of oxygen to the pressure tank 17 and a residual gas mixture with an excess of hydrogen to the pressure tank 17'.

The control device 50 can also use the oxygen and hydrogen contents in the residual gas mixture which are detected via the sensors 13, 14 to control the discharging of the residual gas mixture from the gas circuit 5 in such a way that this discharging is effected depending on a predefined or predefinable gas composition.

For example, the control device 50 can measure the oxygen content and/or the hydrogen content of the residual gas mixture in the gas circuit via the sensors 13, 14 and control the feeding of residual gases into the gas circuit and/or the discharging of residual gas mixture from the gas circuit in such a way that said feeding/discharging is effected depending on the measured oxygen content and/or hydrogen content.

For reasons of safety, the residual gas mixture is advantageously discharged when there is an excess of oxygen in the residual gas mixture.

It is possible for example to use the detected oxygen and/or hydrogen contents or the profile over time of either or both of these to draw conclusions regarding whether oxygen and hydrogen are still being converted into water or whether this process has ended. Residual gas mixture is advantageously discharged via the branch when both the pressure has exceeded a predefined limit value and the conversion of oxygen and hydrogen into water has ended. For example, residual gas mixture can also be discharged from the gas circuit in a controlled manner when the oxygen content assumes a constant value, because a reaction with hydrogen to give water is no longer taking place.

The control device 50 can also measure the temperature of the device 8 for converting hydrogen and oxygen into water via the sensor 15 and control the feeding of residual gases into the gas circuit and/or the discharging of residual gas mixture from the gas circuit in such a way that said feeding/discharging is effected depending on the measured temperature. The temperature and/or the evolution over time thereof can also provide information on whether a conversion of oxygen and hydrogen to water is still taking place or whether this process has already ended. Thus, for example, residual gas mixture can here also be discharged from the gas circuit in a controlled manner when the temperature, starting from a normal value in the case of which hydrogen and oxygen are being converted into water, has fallen to a lower value because hydrogen and oxygen are no longer being converted into water.

An operating method for the entire system composed of fuel cell module 4 and residual gas treatment system 3 can also be realized by means of the control device 50, in which operating method the fuel cells generate residual gases which are treated as above, and wherein the operation of the fuel cells and the treatment of the residual gases are controlled and/or regulated in a manner adapted to one another such that the residual gas mixture discharged from the gas circuit 5 has a predefined or predefinable gas composition, in particular has the gas composition of air. This air can then be used for a very wide variety of applications, for example as breathable air in outside-air-independent systems such as, for example, on board submarines.

The invention claimed is:

1. A process for treating hydrogen-containing and oxygen-containing residual gases from fuel cells, comprising:
   feeding the hydrogen-containing and oxygen-containing residual gases to a gas circuit and circulating a resulting residual gas mixture in the gas circuit through a device for converting hydrogen and oxygen into water in order to reduce an amount of hydrogen and oxygen in the residual gas mixture, discharging at least a portion of the residual gas mixture from the gas circuit and feeding the at least a portion of the residual gas mixture to a gas reservoir or introducing the at least a portion of the residual gas mixture into ambient air, wherein the at least a portion of the residual gas mixture is discharged from the gas circuit and fed to the gas reservoir when a predefined pressure of the residual gas mixture in the gas circuit is exceeded.

2. The process as claimed in claim 1,
wherein the at least a portion of the residual gas mixture is selectively fed to one of at least two gas reservoirs.

3. The process as claimed in claim 2,
wherein a discharged residual gas mixture with an excess of oxygen is fed to a first gas reservoir and a discharged residual gas mixture with an excess of hydrogen is fed to a second gas reservoir.

4. The process as claimed in claim 1,
wherein the at least a portion of the residual gas mixture is discharged from the gas circuit depending on a predefined gas composition.

5. The process as claimed in claim 1,
wherein an oxygen content and/or a hydrogen content in the residual gas mixture in the gas circuit is detected and the feeding of the hydrogen-containing and oxygen-containing residual gases into the gas circuit and/or the discharging of the at least a portion of the residual gas mixture from the gas circuit is/are effected depending on the detected oxygen content and/or hydrogen content.

6. The process as claimed in claim 1,
wherein a temperature of the device for converting hydrogen and oxygen into water is detected and the feeding of the hydrogen-containing and oxygen-containing residual gases into the gas circuit and/or the discharging of the at least a portion of the residual gas mixture from the gas circuit is/are effected depending on the detected temperature.

7. The process as claimed in claim 1,
wherein the hydrogen-containing and oxygen-containing residual gases comprise at least reaction gases of the fuel cells, and/or
wherein the hydrogen-containing and oxygen-containing residual gases comprise purge gases of the fuel cells, and/or start-up and shutdown gases of the fuel cells, and/or blow-up gases or boil-off gases from liquefied gas reservoirs, and/or all gases used for operation of the fuel cells.

8. The process as claimed in claim 1,
wherein operation of the fuel cells and treatment of the hydrogen-containing and oxygen-containing residual gases are controlled and/or regulated such that the at least a portion of the residual gas mixture discharged from the gas circuit comprises a predefined gas composition, and/or comprises a gas composition of air.

9. A residual gas treatment system for hydrogen-containing and oxygen-containing residual gases from fuel cells, comprising:
a gas circuit for a circulation mode of a residual gas mixture comprising the hydrogen-containing and oxygen-containing residual gases, a device for converting hydrogen and oxygen into water, the device being arranged in the gas circuit in order to reduce an amount of hydrogen and oxygen in the residual gas mixture, wherein at least a portion of the residual gas mixture is dischargeable from the gas circuit, a pressure sensor which is arranged in the gas circuit and detects a pressure of the residual gas mixture in the gas circuit, and a control device which is programmed to control discharging of the at least a portion of the residual gas mixture from the gas circuit depending on a detected pressure of the residual gas mixture in the gas circuit, wherein the at least a portion of the residual gas mixture from the gas circuit is discharged when a predefined pressure of the residual gas mixture in the gas circuit is exceeded.

10. The system as claimed in claim 9,
wherein the at least a portion of the residual gas mixture is fed to a gas reservoir or introduced into ambient air.

11. The system as claimed in claim 9, further comprising:
a branch arranged in the gas circuit and a valve for controlling a discharging of residual gas mixture from the gas circuit via the branch.

12. The system as claimed in claim 9, further comprising:
at least two gas reservoirs, wherein the residual gas mixture is selectively fed to one of the gas reservoirs,
wherein a first of the gas reservoirs is a gas reservoir for a residual gas mixture with an excess of oxygen and a second of the gas reservoirs is a gas reservoir for a residual gas mixture with an excess of hydrogen.

13. The system as claimed in claim 9,
wherein the gas circuit comprises a tank configured to receive and mix therein a flow of a hydrogen-containing residual gas and a flow of an oxygen-containing residual gas; and
wherein the gas circuit defines a loop configured to direct any remaining portion of the residual gas mixture to the tank after the at least a portion of the residual gas mixture is discharged from the gas circuit.

14. A residual gas treatment system for hydrogen-containing and oxygen-containing residual gases from fuel cells, comprising:
a gas circuit for a recirculation mode of a residual gas mixture comprising the hydrogen-containing and oxygen-containing residual gases, a device for converting hydrogen and oxygen into water, the device being arranged in the gas circuit in order to reduce an amount of hydrogen and oxygen in the residual gas mixture, wherein at least a portion of the residual gas mixture is dischargeable from the gas circuit, a pressure sensor which is arranged in the gas circuit and detects a pressure of the residual gas mixture in the gas circuit, and a control device configured to control discharging of the at least a portion of the residual gas mixture from the gas circuit depending on a detected pressure of the residual gas mixture in the gas circuit, wherein the at least a portion of the residual gas mixture from the gas circuit is discharged when a predefined pressure of the residual gas mixture in the gas circuit is exceeded.

\* \* \* \* \*